No. 728,900. PATENTED MAY 26, 1903.
W. H. GEORGE.
ROLLER RATCHET CYLINDER WRENCH.
APPLICATION FILED OCT. 23, 1902.
NO MODEL.
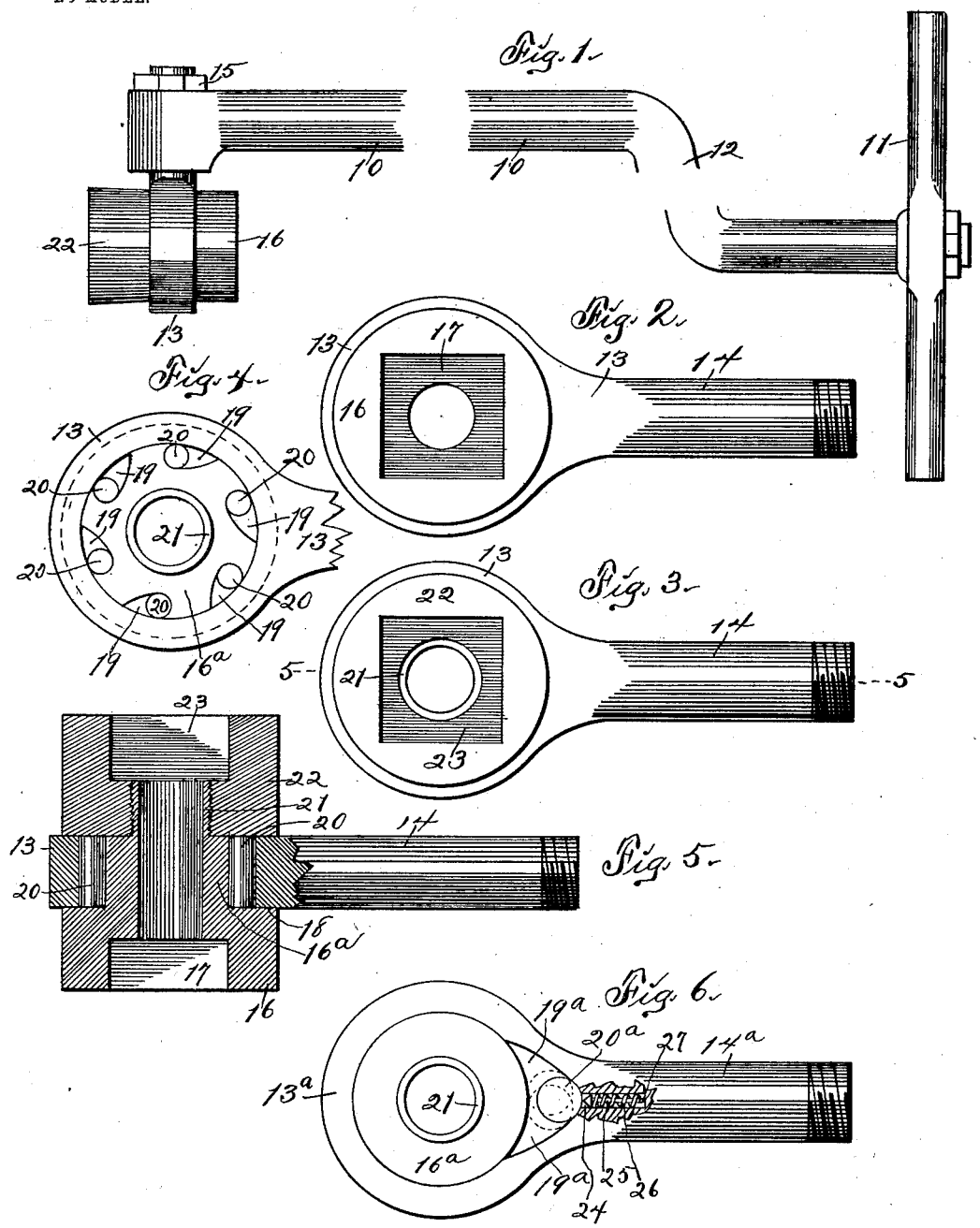

No. 728,900. Patented May 26, 1903.

UNITED STATES PATENT OFFICE.

WILLIAM H. GEORGE, OF DEXTER, IOWA.

ROLLER-RATCHET CYLINDER-WRENCH.

SPECIFICATION forming part of Letters Patent No. 728,900, dated May 26, 1903.

Application filed October 23, 1902. Serial No. 128,448. (No model.)

*To all whom it may concern:*

Be it known that I, WILLIAM H. GEORGE, a citizen of the United States of America, and a resident of Dexter, Dallas county, Iowa, have invented a new and useful Roller-Ratchet Cylinder-Wrench, of which the following is a specification.

The object of this invention is to provide improved means for removing and replacing nuts on or relative to the teeth of cylinders and concaves of threshing-machines.

A further object of this invention is to be found in the provision of a roller-bearing ratchet-head arranged for swivel mounting on a crank or wrench-stock, which head is provided with nut seats or sockets.

My invention consists in the construction, arrangement, and combination of elements hereinafter set forth, pointed out in my claim, and illustrated by the accompanying drawings, in which—

Figure 1 is a view of the wrench, portions of the stock being broken away to economize space. Fig. 2 is a face view of the ratchet-head detached from the stock. Fig. 3 is a reverse view of the ratchet-head detached from the stock. Fig. 4 is a detail view illustrating the roller-bearing of the ratchet-head. Fig. 5 is a longitudinal section of the ratchet-head on the indicated line 5 5 of Fig. 3. Fig. 6 is a detail view of a modified form of ratchet-head corresponding somewhat to Fig. 4, except for the changes therein noted.

In the construction of the device as shown the numeral 10 designates a wrench-stock having a socket or transverse aperture in one end portion and a handle or cross-head 11 on the opposite end portion. The stock 10 is offset at 12 intermediate of its ends and preferably nearer the handle 11 than the opposite end. A wrench-head 13 of annular form is provided and a stem 14 is formed on and leads radially from said head. The stem 14 is mounted in and through the aperture or seat in one end portion of the wrench-stock 10 and may be secured for rotation therein by a nut 15 on its outer end. A wrench-socket 16, having a seat 17 of such size and shape as to receive a nut, is mounted in the annular wrench-head 13. The outer portion of the wrench-socket 16 is of greater diameter than the central portion thereof, thus forming a shoulder 18, overlapping and engaging one side of the wrench-head. The central portion 16ª of the wrench-socket 16 is formed with a plurality of roller-seats 19 in its periphery, and rollers 20 are mounted in said seats. The main portions of the roller-seats 19 are of the same diameter as the rollers 20 and are so located that when the rollers are mounted therein the perimeters of said rollers will just clear or barely engage the inner surface of the annular wrench-head. The roller-seats 19 taper out from their deeper portions to the periphery of the central portion 16ª of the socket 16, and the wall of the tapering portion is slightly curved and gradually tapering as contradistinguished to the abrupt concavity of the body portion of each seat. A screw-threaded stem 21 is formed on the central portion 16ª of the socket 16 and projects beyond the normal plane of the wrench-head 13. A wrench-socket 22, having a nut-seat 23, is screwed on the stem 21 of the socket 16 and overlaps and bears upon the face of the wrench-head opposite to the shoulder 18. It is the function of the socket 22 to hold the socket 16 in its desired position relative to the wrench-head 13 and at the same time serve to receive a nut in one of the operations thereon, as hereinafter described.

In practical operation when the device is mounted as shown in Fig. 1 the socket 22 may be engaged with a nut on a tooth in a cylinder or concave of a threshing-machine and the handle 11 be moved rotatably by manual force applied thereto, thus moving the stock 10 and wrench-head 13. When the stock 10 and wrench-head 13 are moved to the "left," the action of the head rolls the rollers 20 along the inclined or tapering walls of the seats 19 and binds them to said walls, thus establishing a friction between the inner surface of the annulus and the walls of the seats sufficiently great to move the socket 22 to the left and unscrew the nut engaged by said socket. The stock 10 and handle 11 may then be moved to the "right" such distance as is permitted by the bars of the cylinder, and in such movement to the right the wrench-head 13 will be moved to the right and will roll the rollers 20 into the deeper portions of the seats 19 and relax the frictional engagement between the annulus and the socket through the medium of the rollers. Another movement of the handle, stock, and wrench-head to the left will unscrew the nut a little farther, and successive movements to the left and right will remove the nut entirely from the tooth. The wrench-head 13 may then be reversed in its seat in the stock 10 without removing the nut 15, and the socket 16 may be engaged with the nut and moved to the right to screw said nut on the stem of a tooth. Successive movements of the stock, handle, and wrench-head to the right will effect a seating of the nut on the tooth, while movements of the head, stock, and handle to the left will effect a rotation of the head freely on the socket while said socket remains stationary.

In the provision of the two sockets connected as shown and carried by the wrench-head and by mounting the wrench-head reversely in the stock I avoid the necessity of providing means for changing the direction of engagement of the rollers in the wrench, since a reversal of the head effects a reversal of operation on the heads.

In Fig. 6 I show the wrench-head 13ª and sockets mounted thereon similarly to the mounting of the sockets on the wrench-head 13 in the other figures; but instead of forming the roller-seats in one of the sockets I have provided a double inclined roller-seat 19ª in the wrench-head with a single roller 20ª, mounted in said seat and arranged for engagement with the periphery of one of the sockets. A seat 24 is formed in the stem 14ª, and a pin 25 is mounted for reciprocation therein and held by a spring 26 toward the roller 20ª. An ear 27 on the pin 25 projects outwardly for manual act. When the wrench-head is moved in one direction, the roller rolls along one incline of its seat and engages and moves the socket and is held to that side by the spring-pressed pin 25, and when the wrench-head is moved in the opposite direction the roller moves toward the middle of its seat, and if the pin 25 is manually withdrawn and the movement of the head be continued said roller moves along the opposite incline and engages and moves the socket in the opposite direction. Manipulation of the wrench-head under either adjustment of the pin 25 will insure the movement of the socket in a given direction so long as is necessary to unseat a nut engaged by said socket or in the opposite direction so long as is necessary to seat a nut engaged by the other socket.

I claim as my invention—

A roller-ratchet cylinder-wrench, comprising the wrench-stock offset intermediate of its ends, the wrench-head of annular form swiveled in one end portion of said stock, the nut-socket formed with a reduced central portion pivotally mounted in said wrench-head and a further-reduced end portion exteriorly screw-threaded, the binding nut-socket centrally apertured and threaded for screw-seating on the smaller end portion of the first socket, said sockets conjunctively reversible with said head in said stock and conjunctively rotatable in either direction in the head, and rollers interposed between the inner surface of the wrench-head and the perimeter of the reduced central portion of the first socket, whereby in rotary movement of the stock and head the rollers may rotate said sockets conjunctively in either direction dependent on the position of the sockets and head relative to the stock.

Signed by me at Des Moines, Iowa, this 29th day of September, 1902.

WILLIAM H. GEORGE.

Witnesses:
IDA ANDERSON,
S. C. SWEET.